United States Patent [19]

Nakano et al.

[11] Patent Number: 5,160,571
[45] Date of Patent: Nov. 3, 1992

[54] TAPE LOADING DEVICE INTO CASSETTE

[75] Inventors: Haruo Nakano; Koichi Sota, both of Chohu, Japan

[73] Assignee: Otari, Inc., Chohu, Japan

[21] Appl. No.: 644,098

[22] Filed: Jan. 22, 1991

[30] Foreign Application Priority Data

Jan. 31, 1990 [JP] Japan .................................. 2-22835

[51] Int. Cl.⁵ ............................................ B65H 21/00
[52] U.S. Cl. .................................... 156/505; 156/502; 156/507; 156/510; 156/511; 156/157; 156/159; 156/304.1; 242/56 R
[58] Field of Search ............... 156/502, 505, 507, 510, 156/511, 157, 159, 304.1, 304.3; 242/56 R

[56] References Cited

U.S. PATENT DOCUMENTS

| | | | |
|---|---|---|---|
| 3,825,461 | 7/1974 | Gorman | 156/502 |
| 3,848,825 | 11/1974 | Zielke | 156/502 X |
| 3,997,123 | 12/1976 | King | 156/502 X |
| 4,062,719 | 12/1977 | Masuzima et al. | 156/502 |
| 4,417,942 | 11/1983 | Kincheloe | 156/502 |
| 4,501,630 | 2/1985 | Kiuchi | 156/159 |
| 4,632,327 | 12/1986 | Kreeft et al. | 156/502 X |
| 4,854,517 | 8/1989 | Watanabe et al. | 156/502 X |

*Primary Examiner*—David A. Simmons
*Assistant Examiner*—J. Sells
*Attorney, Agent, or Firm*—David O'Reilly

[57] ABSTRACT

A cassette tape loading device comprised of a cassette holding means for holding a cassette case, a tape supplying means for supplying a magnetic tape, a first splicing block means for releasably holding a leading end of the magnetic tape, a leader tape drawing means for drawing out leader tape from the cassette case, a second splicing block means for releaseably holding the leader tape, a third splicing block means for releaseably holding a cut end of said leader tape or a cut end of said magnetic tape, a first cutting means for cutting the leader tape held by the second and third splicing block means between the second and third splicing block means when the third splicing block means combines with the second splicing block means, a second cutting means for cutting a magnetic tape held by the first and third splicing block means between the first and third splicing block means when the third splicing block means combines with the first splicing block means, splice means for splicing both the cut end of said leader tape held by the first splicing block means and the leading end of the magnetic tape held by the splicing block means when the third splicing block means combines with the first splicing block means, splicing tape pre-adhesion means for pre-adhering a splicing tape to the cut end of the magnetic tape held by the third splicing block means in a manner such that the head of the splicing tape juts out beyond the cut end of the magnetic tape, an adhesion means for joining the cut end of the leader tape held by the second splicing block means with the magnetic tape held by the third splicing block means when said second splicing block means combines with the third splicing block means.

4 Claims, 3 Drawing Sheets

TAPE LOADING DEVICE INTO CASSETTE

BACKGROUND OF THE INVENTION

1. Field of the Invention

The present invention relates to a magnetic tape winding device around a hub provided in a cassette case, and more particularly relates to a cassette tape loading device which is used in a process for cutting and joining of a leader tape and a magnetic tape.

2. Description of the Prior Art

Heretofore, magnetic tape winding devices around a hub provided in cassette cases are developed with a leader tape drawn out from a cassette case, a magnetic tape joined to the leader tape, and the magnetic tape being wound around the hub rotated in the cassette case.

For example, there is the device shown in published Japanese Patent Laid-Open No. 63-225984 wherein said device comprises a leader tape holding means, a magnetic tape holding means, and joining means for joining the leader tape with the magnetic tape. The leader tape holding means, magnetic tape holding means and joining means being movable, respectively, while the supplied cassette case is fixed. In a joining operation of a leader tape and a magnetic tape using the above-mentioned device shown in published Japanese Patent Laid-Open No. 63-225984, there is no necessity for moving the cassette case. Therefore, it is possible to join a leader tape with a magnetic tape without the leader tape being drawn out lengthwise so that this device can be used for a cassette case with a short leader tape.

However, in the above-mentioned device, there is a problem in that the tape holding means and the tape joining means should travel, while the cassette case is fixed. But the space needed for travel of the tape holding means and the tape joining means is restricted, so the motion of the mechanism of the device become generally complicated. In particular, the tape joining means is complicated as compared with a conventional device, because the tape joining operation must be carried out in a small space. Therefore cost is excessive for the above-mentioned device.

SUMMARY OF THE INVENTION

It is therefore an object of the present invention to provide a cassette tape loading device wherein the tape joining operation can be performed surely and reasonably even if the leader tape of the cassette case is short. A tape holding means and a tape joining means are comparatively simple in structure, and the motion of the tape holding means and the tape joining means are comparatively simple.

To this end, the cassette tape loading device for winding magnetic tape around a hub provided in a cassette comprises:

a cassette holding means for holding the cassette case;

a tape supplying means for supplying magnetic tape;

a first splicing block means for releasably holding the leading end of the magnetic tape supplied from the magnetic tape supplying means;

a leader tape drawing means for drawing out the leader tape from the cassette case;

a second splicing block means for releasably holding the leader tape drawn out from the cassette case by the leader tape drawing means;

a third splicing block means for releasably holding either a cut end of the leader tape or a cut end of the magnetic tape, said third splicing block means being able to selectively combine with the first splicing block means or second splicing block means;

a first cutting means for cutting the leader tape held by the second and third splicing block means, wherein the leader tape is cut by the first cutting means when the leader tape passes through and between the second and third splicing block means when the third splicing block means is combined with the second splicing block means;

a second cutting means for cutting a magnetic tape held by the first and third splicing block means, wherein the cutting magnetic tape is cut by the second cutting means when said magnetic tape passes through and between the first and third splicing block means when the third splicing block means is combined with the first splicing block means; a splice means for splicing both the cut end of the leader tape held by the first splicing block means and the leading end of the magnetic tape held by said splicing block means when the third splicing block means is combined with the first splicing block means; a splicing tape pre-adhesion means for preadhering splicing tape to the cut end of the magnetic tape held by the third splicing block means in a manner such that the head of the splicing tape juts out beyond the cut end of the magnetic tape;

adhesion means for joining the cut end of the leader tape held by the second splicing block means and the magnetic tape held with the third splicing block means when the second splicing block means is combined with the third splicing block means.

In carrying out the cassette tape winding operation with the cassette tape loading device according to the present invention, first, a leader tape drawn out from the cassette case is held by a second and third splicing block means, then the leader tape is passed through and between the second and third splicing block means at which time the leader tape is cut by a first cutting means.

Then the third splicing block means holding the cut end of the leader tape travells to a position adjacent to a first splicing block means holding the leading end of the magnetic tape, at which the cut end of the leader tape is joined with the leading end of the magnetic tape by a splicing tape from a splice means.

Thereafter a given amount of the magnetic tape is wound around a hub provided in the cassette case, then the magnetic tape is cut by a second cutting means when the magnetic tape passes through and between the first and third splicing block means.

Then, again, a splicing tape is adhered to the cut end of the magnetic tape held by the third splicing block means, at which time the first splicing block means is returned to a given position so that the splicing tape is adhered to the magnetic tape in a manner such that an end of the splicing tape juts out beyond the magnetic tape.

Further, the third splicing block means is moved to its starting position so that the third splicing block means is adjacent to the second splicing block means.

Thereafter, a splicing tape jutting out of the cut end of the magnetic tape held by the third splicing block means is adhered to the cut end of leader end held by the second splicing block means, thereby, the joining operation of both tapes is finished.

BRIEF DESCRIPTION OF THE DRAWINGS

The above objects, characteristics, and advantages of the present invention will become apparent from the following detailed description of the preferred embodiments, with reference to the accompanying drawings which are presented as non-limiting examples, in which.

DETAILED DESCRIPTION OF PREFERRED EMBODIMENTS

Figure 1:
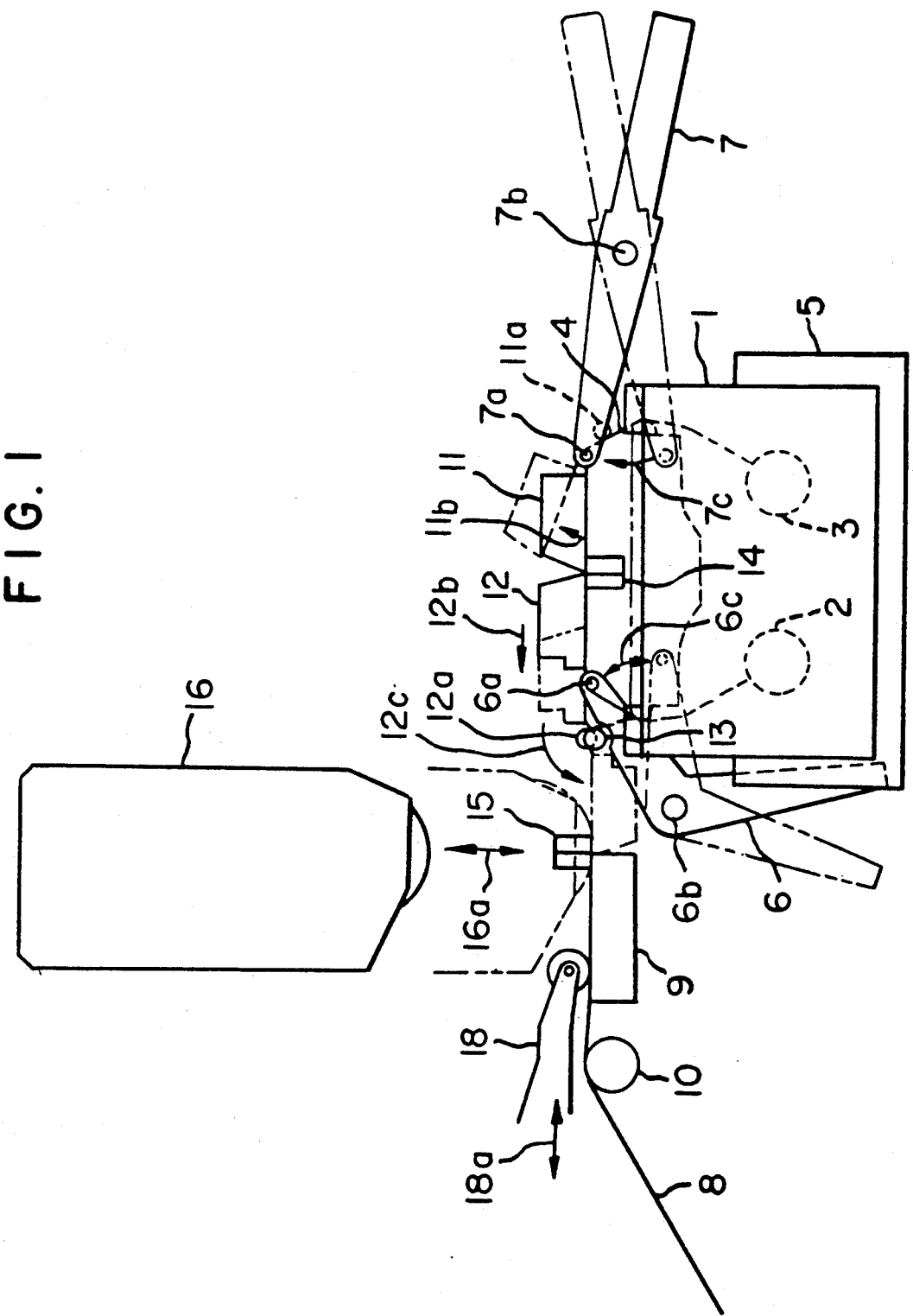
FIG. 1 is a schematic representation of an embodiment of the present invention under one operative condition.
Figure 2:
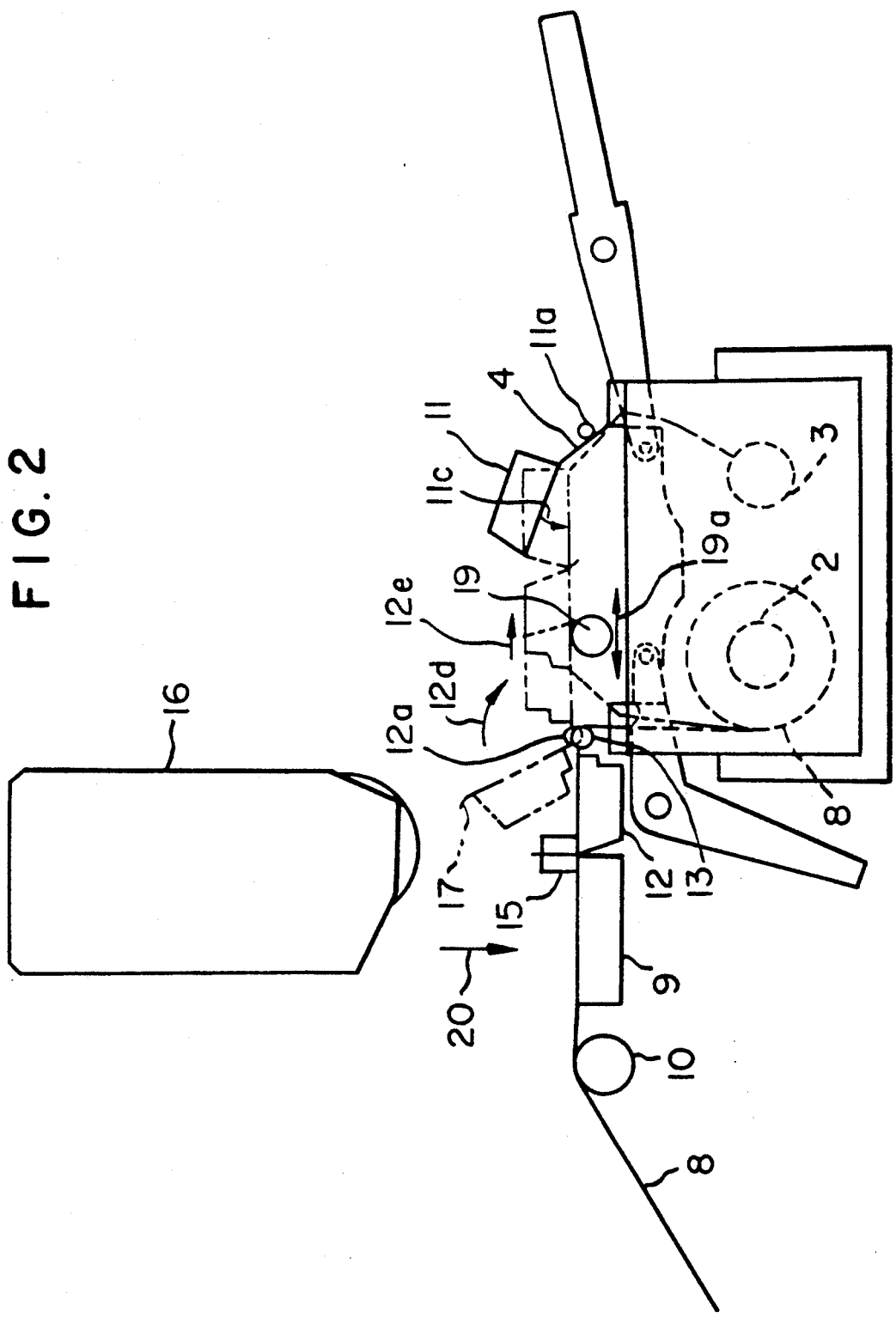
FIG. 2 is a schematic representation of the same embodiment of the present invention under another operative condition.

Referring to FIGS. 1 and 2, a cassette tape loading device according to the present invention comprises cassette holding means 5 for holding cassette case 1 having hubs 2 and 3 to which both ends of leader tape 4 are connected, and leader tape drawing means 6 and 7 for drawing leader tape 4 by drawing pins 6a and 7a. Leader tape drawing means 6 is rotatable on axes of rotation 6b and 7b in the directions of arrows 6c and 7c. First splicing block means 9 holds a leading end of magnetic tape 8 supplied from a magnetic tape supplying reel (not shown). In front of first splicing block means 9, guide roller 10 guides magnetic tape 8 onto first splicing block means 9. The cassette tape loading device further comprises second splicing block means 11 holding leader tape 4 being rotatable on axis of rotation 11a in the direction of arrow 11b, and third splicing block means 12 for holding leader tape 4 or magnetic tape 8. Third splicing block means 12 is rotatable on axis of rotation 12a in the direction of arrow 12c after travelling in the direction of arrow 12b. Tape guide 13 guides leader tape 4 or magnetic tape 8 passing through third splicing block means 13. The cassette tape loading device further comprises first cutting means 14 which cuts leader tape 4 passing through and between second splicing block means 11, third splicing block means 12, second cutting means 15 which cuts magnetic tape 8 passing through and between first splicing block means 9 and third splicing block means 12. Also included are splice means 16 for supplying splicing tape 17 to join leader tape 4 with magnetic tape 8, the splice means being movable in the direction of arrow 16a, and adhesion means 18 for securely joining splicing tape 17 with leader tape 4 and magnetic tape 8, the adhesion means being movable in the direction of arrow 18a. Another adhesion means 19 is also provided as shown in FIG. 2, this adhesion means is movable in the direction of arrow 19a, however it is drawn back to the given position (not shown) except when a joining operation is carried out.

Operation of the above-mentioned embodiment is explained. As shown in FIG. 1, when cassette case 1 is held by cassette holding means 5, first, leader tape drawing arms or leader tape drawing means 6 and 7 are rotated on axes of rotation 6b and 7b from one position shown by a dotted line to another position shown by a solid line, respectively. At this time leader tape 4 is drawn out of cassette case 1 by drawing pins 6a and 7a, and held by second splicing block means 11 and third splicing block means 12, while said leader tape drawing means 6 and 7 are returned to their staring positions, and leader tape 4 is cut by first cutting means 14.

After the cutting operation of leader tape 4 is finished, second splicing block means 11 is rotated on axis of rotation 11a in the direction of arrow 11b to the position shown by the dotted line, with second splicing block means 11 holding cut end of leader tape 4.

On the other hand, third splicing block means 12 also travells in the direction of arrow 12c, then rotates on axis of rotation 12a in the direction of arrow 12c, 180° while holding cut end of leader tape 4. By this operation, third splicing block means 12 adjacent to first splicing block means 9 holds leading end of magnetic tape 8.

Thereafter, splice means 16 descends in the direction of arrow 16a and leading end of magnetic tape 8 and cut end of leader tape 4 are connected by splicing tape 17. Thereafter leading end of magnetic tape 8 and cut end of leader tape 4 are securely joined with each other by passing across the top face of splicing tape 17.

After the joining operation of both tapes 8 and 4, as shown in FIG. 2, magnetic tape 8 passes across guide roller 10 and tape guide 13, and is sent to hub 2, to be wound around hub 2 a given amount. After the winding operation, magnetic tape 8 is cut by second cutting means 15, while being held by first splicing block means 9 and third splicing block means 12.

Figure 3:
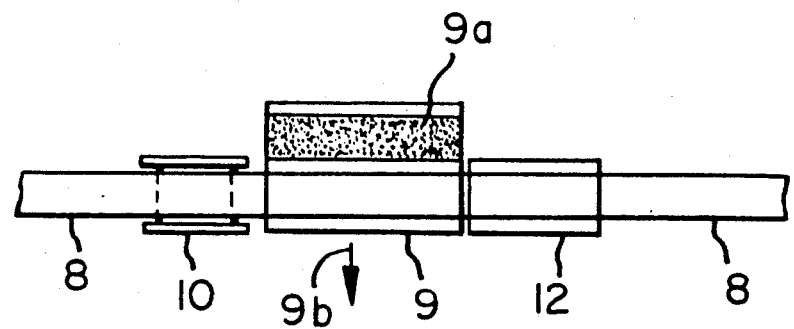
FIG. 3 is a schematic representation of a first splicing block means under one operative condition.
Figure 4:
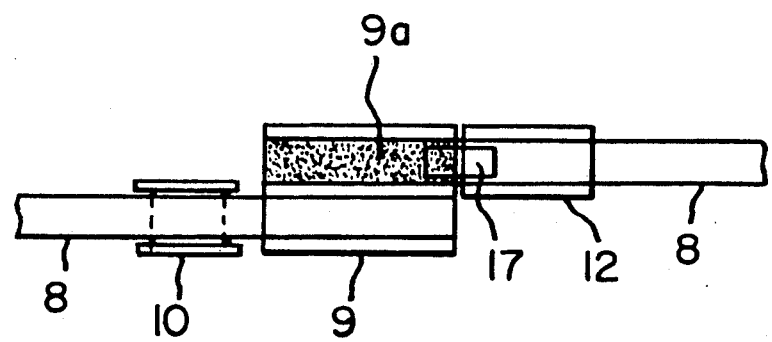
FIG. 4 is a schematic representation of the same splicing block means under another operative condition.

FIGS. 3 and 4 are explanatory drawings to illustrate the operation of first splicing block means 9 shown in FIG. 2 taken in the direction of arrow 20.

As shown in FIG. 3, first splicing block means 9 is comprised of tape pre-adhesion part 9a for joining both tapes 8 and 4 and to easily peel off from each other. On cutting magnetic tape 8, first splicing tape 17 is moved in the direction of arrow 9b, while holding cut end of magnetic tape 8.

The above-mentioned tape pre-adhesion part 9a has a rough surface so that splicing tape 17 can be easily peeled off.

Then, as shown in FIG. 4, when tape pre-adhesion part 9a travels to a position adjacent to tape running surface of the third splicing, splice means 16 is again operated so that splicing tape 17 adhereds to magnetic tape 8, as shown in FIG. 4.

After this pre-adhesion operation, third splicing block means 12 rotates on axis of rotation 12a in the direction of arrow 12e, then travels in the direction of arrow 12e to return to its starting position. By this operation, splicing tape 17 is quickly peeled off tape pre-adhesion part 9a, moved together with third splicing block means 12 in the condition where splicing tape 17 juts out beyond the cut end of magnetic tape 8.

When third splicing block means 12 is returned to its starting position, second splicing block means 11 rotates on axis of rotation 11a in the direction of arrow 11c so that second splicing block means 11 is positioned at a position adjacent to third splicing block means 12.

Adhesive means 19 is then moved from given position (not shown), to the position shown in FIG. 2, and reciprocated in the direction of arrow 19a, thereby splicing tape 17 juts out beyond the cut end of magnetic tape held by third splicing block means 12 is pressed against cut end of leader tape 4 held by second splicing block means 11 so that both tapes can be securely joined to each other.

After this joining operation, second splicing block means 11 and third splicing block means 12 release the cut end of leader tape 4 and cut end of magnetic tape 8.

Finally, leader tape 4 and magnetic tape 8 are wound around hub 2, thereby the whole operation is completed. According to the present invention, since the respective components are rationally and economically arranged, even though a leader tape is housed in a cassette case, the tape joining operation can be securely performed without applying excessive force to the leader tape. Further since the whole operation is comparatively simple, there is no necessity for a complicated constructing of a the tape loading device in the cassette, therefore excessive cost is avoided.

What is claimed is:

1. A cassette tape loading device for winding magnetic tape around a hub provided in a cassette comprising:

cassette case holding means for holding said cassette case;

magnetic tape supply means for supplying said magnetic tape;

first splicing block means for releasably holding a leading end of said magnetic tape supplied from said magnetic tape supply means;

leader tape drawing means for drawing out a leader tape from said cassette case;

a second splicing block means for releasably holding said leader tape drawn out from said cassette case by said leader tape drawing means;

a third splicing block means for releasably holding a cut end of said leader tape or a cut end of said magnetic tape, said third splicing block means being able to selectively combine with said first splicing block means or said second splicing block means;

first cutting means for cutting said leader tape held by said second and third splicing block means, wherein said leader tape is cut by said first cutting means when said leader tape is passed through and between said second and third splicing block means when said third splicing block means combines with said second splicing block means;

a second cutting means for cutting a magnetic tape held by said first and third splicing block means, wherein said magnetic tape is cut by said second cutting means when said magnetic tape is passed through and between said first and third splicing block means when said third splicing block means combines with said first splicing block means;

a splice means for splicing the cut ends of said leader tape held by said third splicing block means and the leading end of said magnetic tape held by said first splicing block means when said third splicing block means combines with said first splicing block means;

a splicing tape pre-adhesion means for pre-adhering a splicing tape to the cut end of said magnetic tape held by said third splicing block means and to a pre-adhesion surface in a manner such that the head of said splicing tape extends out beyond the cut end of said magnetic tape;

adhesion means for joining the cut end of said leader tape held by said second splicing block means with said magnetic tape held by said third splicing block means when said second splicing block means combines with said third splicing block means.

2. A cassette tape loading device as claimed in claim 1 wherein the pre-adhesion surface is rough so that splicing tape is easily peeled off from said pre-adhesion surface.

3. Apparatus for splicing and loading magnetic tape into a cassette comprising:

cassette case holding means;

magnetic tape supply means;

first splicing block means for releasably holding a leading end of said magnetic tape supplied from said magnetic tape supply means;

leader tape extending means for extending a leader tape from said cassette case;

second splicing block means for releasably holding said leader tape extended from said cassette case;

third splicing block means for releasably holding a cut end of said leader tape or said magnetic tape;

means for selectively combining said third splicing block means with said first splicing block means or said second splicing block means;

first cutting means for cutting said leader tape held by said second and third splicing block means when said second splicing block means is combined with said third splicing block means and said leader tape is passed between said combined second and third splicing block means;

second cutting means for cutting a magnetic tape held by said first and third splicing block means when said third splicing block means is combined with said first splicing block means and said magnetic tape is passed between said combined first and third splicing block means;

splice means for splicing the cut ends of said leader tape held by said third splicing block means and said magnetic tape held by the combined first and third splicing block means;

splicing tape pre-adhesion means for pre-adhering a strip of splicing tape to the cut end of said magnetic tape held by said third splicing block means and to a pre-adhesion surface so that said strip of splicing tape is pre-adhered to and extends beyond the cut end of said magnetic tape;

adhesion means for joining the cut end of said leader tape held by said second splicing block means with said cut end of said magnetic tape held by said third splicing block means when said second splicing block means is combined with said third splicing block means.

4. The apparatus according to claim 3 in which said pre-adhesion surface is constructed to allow said strip of splicing tape to be easily peeled off said pre-adhesion surface after being attached to the cut end of said magnetic tape.

* * * * *